United States Patent
Hardiman et al.

(10) Patent No.: US 11,058,948 B1
(45) Date of Patent: Jul. 13, 2021

(54) PREDICTIVE MODELING FOR MULTIPLAYER GAMING

(71) Applicant: Amazon Technologies, Inc., Reno, NV (US)

(72) Inventors: Jeremy Hardiman, Kenmore, WA (US); Christian R. Lange, Snohomish, WA (US); Adam Smith, Seattle, WA (US); Joseph Francis Stankowicz, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/680,618

(22) Filed: Aug. 18, 2017

(51) Int. Cl.
  *A63F 13/355* (2014.01)
  *A63F 13/52* (2014.01)
  *A63F 13/798* (2014.01)

(52) U.S. Cl.
  CPC ............ *A63F 13/355* (2014.09); *A63F 13/52* (2014.09); *A63F 13/798* (2014.09); *A63F 2300/57* (2013.01)

(58) Field of Classification Search
  CPC ...... A63F 13/355; A63F 13/52; A63F 13/798; A63F 13/67; G06Q 30/0269; G06Q 30/0277; H04L 67/22; H04L 67/306; G06F 17/5081; G06F 17/5009; G06F 17/5068; A63B 69/38; A63B 69/40; A63B 71/06; A63B 24/00
  See application file for complete search history.

(56) References Cited

U.S. PATENT DOCUMENTS

| | | | | |
|---|---|---|---|---|
| 2006/0121992 A1* | 6/2006 | Bortnik | .................. | A63F 13/537 463/43 |
| 2007/0238529 A1* | 10/2007 | Iwamoto | .................. | H04W 4/60 463/42 |
| 2014/0179428 A1* | 6/2014 | Miura | .................... | A63F 13/355 463/31 |
| 2015/0217198 A1* | 8/2015 | Curtis | ..................... | A63F 13/67 463/31 |
| 2015/0242562 A1* | 8/2015 | Wang | .................... | G06F 30/398 716/53 |
| 2015/0371139 A1* | 12/2015 | Kamlani | ................... | G06N 3/02 706/12 |
| 2017/0024770 A1* | 1/2017 | Abdulkader | ....... | G06Q 30/0277 |
| 2017/0368439 A1* | 12/2017 | Khazanov | .............. | A63B 69/40 |
| 2018/0001190 A1* | 1/2018 | Kerr | ........................ | A63F 13/79 |

* cited by examiner

*Primary Examiner* — Yingchuan Zhang
(74) *Attorney, Agent, or Firm* — Hogan Lovells US LLP

(57) ABSTRACT

Machine learning is used to generate and update predictive models configured to predict the positions, orientations, or actions of various gameplay elements capable of being controlled by players of a network-based multiplayer game. A gaming server can send a trained predictive model to each player device actively involved in a gaming session. Those devices can use the predictive model to predict the positions and orientations of various gameplay elements, where the actual data will not be received for a period of time due to latency of transmission over at least one network connection. When the actual data is received, the game state and gameplay action can be corrected or initiated as appropriate, enabling the overall gameplay experience to be smoother and more enjoyable. The gameplay and prediction data can be analyzed to further train or improve the models.

20 Claims, 7 Drawing Sheets

PREDICTIVE MODELING FOR MULTIPLAYER GAMING

BACKGROUND

The widespread adoption of portable computing devices, such as smartphones and tablet computers, has resulted in a corresponding increase in the variety of gaming options available to players. Many of these games enable users to engage in online multiplayer games, which may be hosted by a central gaming server. Because users can have a variety of different network connections with different transmission speeds, for example, it can be difficult to provide accurate gameplay as it may take a significant amount of time for player data to pass from a player's device, to the central server, and then propagate out to the devices of the other players. During that time, the players may have moved or taken actions such that an action that appears to occur with respect to the current position of a player actually corresponds to a past location of that player. Many modern games utilize static prediction logic coded into the gaming application, which bases actions on where players are predicted to be at certain times in the near future. This manually coded prediction logic is complex and time consuming to generate, and does not adapt for different players, applications, or gaming sessions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for execution and management of electronic gaming applications. In particular, various approaches utilize machine learning to generate and update predictive models that can be used to predict the positions, orientations, or actions of various gameplay elements (e.g., player characters) capable of being controlled by other players, devices, or applications with respect to a network-based multiplayer game. A dedicated gaming server can send a trained predictive model to each player device actively involved in a gaming session. Those devices can use the predictive model to predict the positions, orientations, or other state of gameplay elements for the game, where the actual data will not be received for those elements for a period of time due to latency of transmission over at least one network connection. When the actual data is received, any position, orientation, or gameplay action can be corrected as appropriate, enabling the overall gameplay experience to be smoother and more enjoyable. The gameplay and prediction data can be analyzed in an online or offline process to further train or improve the models. The models used can also be selected for certain sessions, or updated during those sessions, based upon network conditions or other aspects of the game session.

Various other functions can be implemented within the various embodiments as well as discussed and suggested elsewhere herein.

Figure 1A:
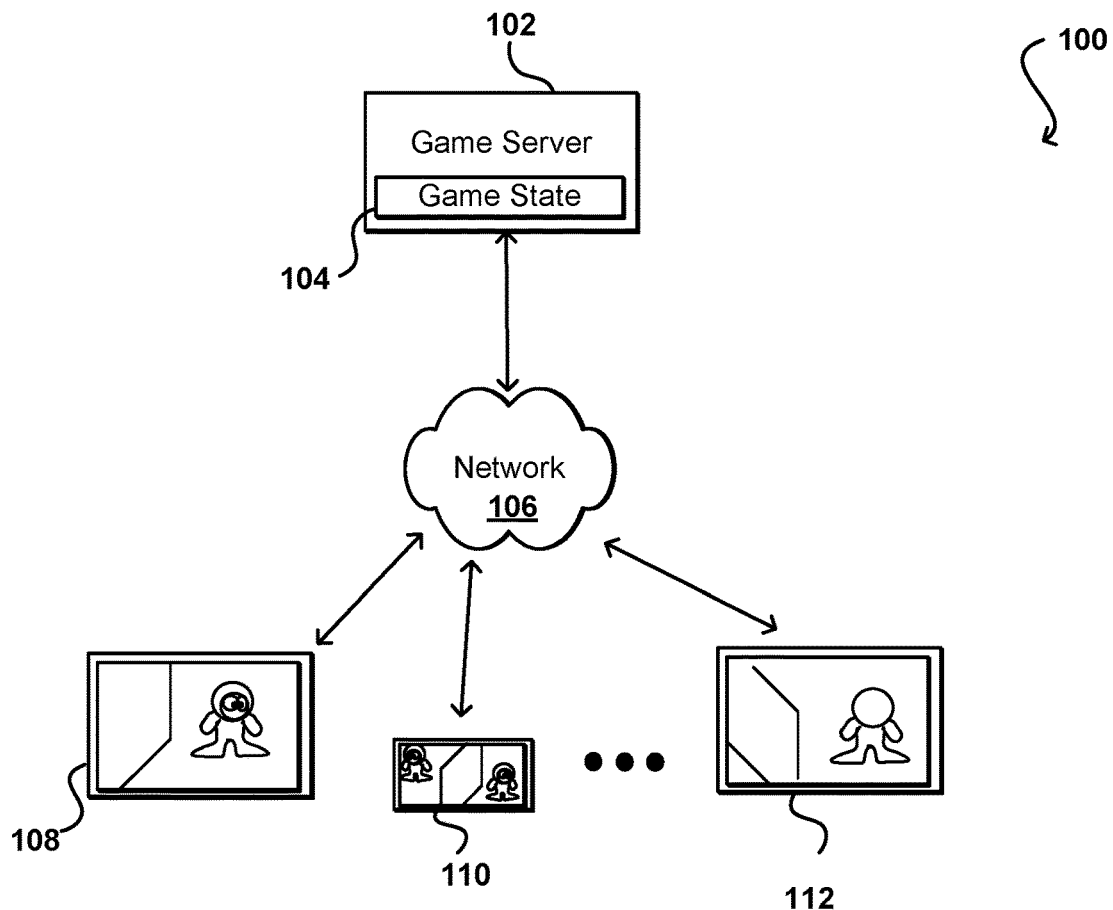
FIGS. 1A and 1B illustrate example gameplay for a multiplayer game that can be processed in accordance with various embodiments.

FIG. 1A illustrates an example gaming configuration 100 that can be managed in accordance with various embodiments. In this example, a gaming session is hosted on at least one game server 102. The game server 102 can be a local gaming machine or a remote server operated by a game provider, among other such options. In this example the game offers multiplayer capability, whereby multiple players can utilize respective devices 108, 110, 112 to connect to the game server 102 over at least one network 106, such as the Internet, a local area network, a dedicated gaming network, a peer-to-peer network, or a cellular network, among other such options and combinations thereof. The players can join in a session of the game with state data that is managed by a game state component 104 of the game server. In some embodiments one or more game servers 102 can execute the game, while in others the servers can manage game state for instances of the game executing on the various player devices 108, 110, 112, among other such options. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 102 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices.

In many instances, a first player will submit a request to join a session of a specified gaming application supported by the game server 102. If there is an existing game session for which the player qualifies, such as by having an appropriate skill level or qualification, then the player can be added to the existing game session. If there is no existing game session for which the player qualifies, or if games can only be joined before the session starts, then the request can trigger the initiation of a new session for the game. In some embodiments the new session can begin immediately, while in other embodiments or for specific games there might need to be a specified number, minimum number, or quorum of players for a session before the session can begin. For example, if a game requires ten players then a session might not start before ten players have joined, with the first nine players having to wait at least until a tenth player joins. In some cases additional players can join during a session, such as up to a maximum number of players in some embodiments, while in others players may not be able to join, or may only be able to join if a current player leaves the session, etc.

In many situations, the player devices will be at different geographical locations. In order to ensure that all the game state information utilized by the player devices is accurate, player input in many cases will be transmitted from the individual player devices to the relevant game server 102, such that the game state can be updated by the game state manager 104, and the updated game state information can be propagated to the various player devices such that the devices are all utilizing consistent game state information. The game state information can include, for example, position and orientation information for the players and objects in the game, as well as gameplay data for actions being performed in the game environment by any of the players or other gameplay elements. Such an approach can result in difficulty managing state for the game, however, as any instance of player data must be transmitted from the respective player device to the server, and sent back to the relevant gaming devices. Since players can have various types of network connections with differing speeds, including cellular and landline-based connections, there can be significant latency involved in getting gameplay data from one player device to another. For games such as real time, multiplayer online video games, this latency can have a meaningful, negative impact on gameplay. For example, if the game involves throwing a ball or shooting a paint gun, a first player might direct the action towards a last known location received for a target player. The action will be likely to miss, as the other player may have moved since the last received location such that the first player may see the action take place but the action will actually fail because when the game state data is synchronized the target player will actually not have been in that location. The game server then might have to retract the apparently completed action, or wait to determine whether the action is successful, either of which can significantly degrade the gaming experience.

Figure 1B:
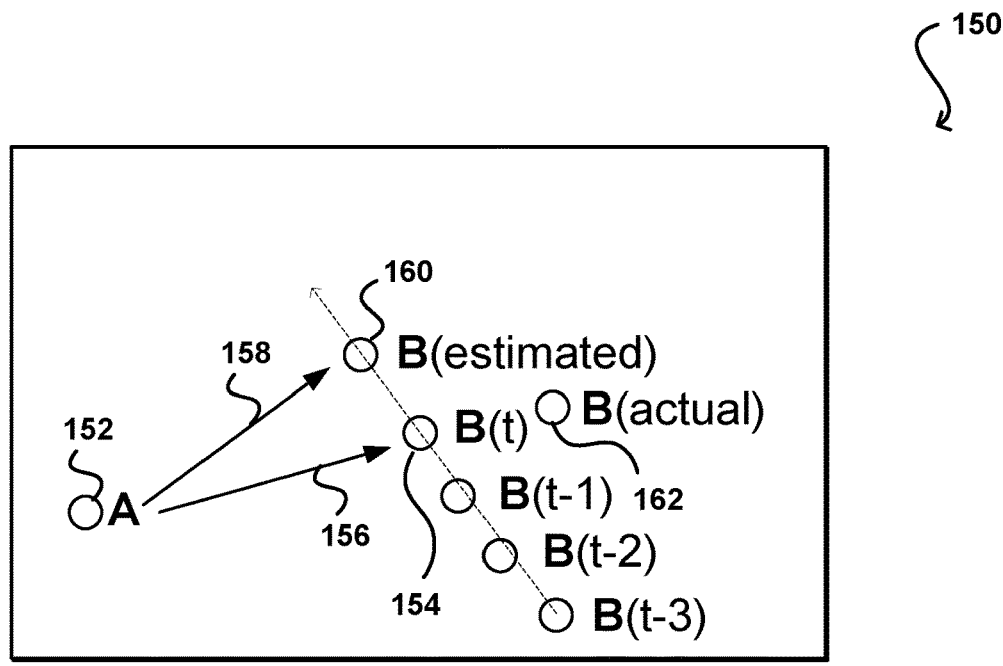

In an attempt to manage the issues with latency, many conventional gaming services implement static gameplay prediction logic. Traditionally this prediction logic is manually generated by a developer around a set of player data. In one example, the prediction can be a linear extrapolation using a player's prior positions, including a rate or type of movement. This can then be used to determine both the direction and the speed, along with other factors such as a maximum speed of a type of character and other such data. FIG. 1B illustrates results 150 of such a prediction model that can be utilized in accordance with various embodiments. In this example, a first player 152 (Player A) is at a first position in an overhead view of the gameplay location. A second player 154 (Player B) is at a second location in the overhead view. This corresponds to the last position reported for Player B as received to a device corresponding to Player A. If player A throws a ball to Player B at the last reported position 154, along a given trajectory 156, the throw would miss because at the time the ball arrives in the game Player B is at a different actual location 162. In order to have the game appear to be in real time, the game could use the last reported position 154 which would show that the ball was successfully delivered, but would then have a problem when the synchronized gameplay data shows the player actually moved to a current actual location 162. By the time the action data gets to the device of Player B, the trajectory 156 would have caused the ball to miss Player B. There would be difficulty in reconciling the two local gameplay states after the fact.

As mentioned, an approach to minimizing the latency impact, resulting in events happening at different times on different devices, involves attempting to predict the location of Player B at a near future point in time, and make determinations based on the predicted location(s) instead of the last reported location. For example, the position data in FIG. 1B shows the last reported position 154 of Player B, as well as the three prior locations with associated timestamps or time data. Based on the current location and the recent prior locations, a future prediction can be extrapolated by a fitting a linear function, curve, or exponential function, etc., to the set of recent points. This can include a time component as well in at least some embodiments. In this example, a linear extrapolation (or interpolation) is applied to the recent location points to determine a predicted future location 160 of Player B based on Player B's recent movement and information known about the game, the type of character controlled by Player B, and other such information. In this way, Player A would be determined to successfully target Player B by throwing the ball along a different trajectory 158, which would arrive at the predicted location 160 at the associated time. As illustrated, however, if Player B actually moved to the current actual location 162 then the same problem would occur, wherein the device for Player A would register a successful throw while the device for Player B would indicate a miss, which would need to be reconciled. If there is 50 milliseconds of latency between each device and the game server, then the actual game data will be received at least 100 milliseconds after it is triggered, which may be unacceptable for fast moving or high precision games.

Accordingly, approaches in accordance with various embodiments can attempt to provide for more accurate predictions in a multiplayer gaming environment, or other such networked environment. In particular, various embodiments can attempt to use trained models, or other machine learning techniques, to better model and predict the movement or actions of players to a game, in order to provide for higher accuracy gameplay, and a gameplay experience that is smoother and more enjoyable. In addition to improving gameplay, such an approach no longer requires a software engineer or developer to be very familiar with predictive models and game mechanics, as well as to manually code that prediction logic into the gaming application. Even if an accurate prediction model is developed for a game, that model will not necessarily translate to other games, as players to an adventure game will behave much differently than for a racing game or first person shooter, etc.

In various embodiments, machine learning can be used to train and update a predictive model that can accurately predict the movement or actions of a character over a future period of time. In one example, a player's local client (e.g., computing device or application) can connect to a corresponding data server, or other network game management system. At least some of the game data may already be stored on, installed to, or available on the client device. In order to join a game session, the client device might receive session or state data for that session, along with any game data needed for the session and not already available to the client device. In this example, the gaming device can also receive a most recent predictive model if not already stored on the client device. The predictive model can be trained on data for a particular game, or type of game, and can be used to predict behavior based upon various aspects of the current gaming session. During gameplay on the session, the local client can execute the predictive model, such as to continually accept gameplay data and predict actions of various players, characters, or other gameplay elements. The prediction data can be used in place of the actual game state data until such time as the actual game state data is received to the client device, at which time any variations or inaccuracies in the predicted position can be accounted for with respect to the actual position. The prediction data can also be provided to the game server, which can store this prediction data with the actual gameplay data, once received or determined, in order to further train or update the model. The execution of the model and transmission of the data can be performed at a determined frequency that provides for adequate functionality while not interfering with gameplay or excessively consuming resources.

A gaming server in one embodiment can be responsible for managing game state information for at least one gaming session. The server can collect game information from all players, or player devices or applications, for a current gaming session, and can aggregate and correlate the data to generate a current set of game state data based upon the inputs or actions of the various players. This information can then be propagated to the various clients for use in updating game state data, as well as predicting future game state data. The gaming server can also collect other data useful in predicting player action, as may relate to the various latencies from different client devices, which may provide an indication of the delay for each player and the type or amount of prediction needed for that player, where the amount of prediction may vary by player. In some embodiments the amount of prediction may be the same but the actual data may be reconciled more quickly for players with faster connections. The game server in some embodiments can also provide this and other game state information (such as performance statistics and the like) to a master database or game repository, to which all other game servers may also send similar data.

The master database for a game, or gaming service, can then potentially include information for all players, sessions, and variations of a game, or set of games. This enables the prediction models to be trained and updated using all available data, instead of data for specific players or sessions. These models can then be more accurate in predicting movement and actions of the average players, new players, or players for which there may not be sufficient data. In some embodiments the models provided to a player device might also, or alternatively, be trained for movements of the respective player, or associated players, in order to be more accurate for specific players or sessions. For example, a model might be trained for a specific player based on historical action data, and that model can be provided to the game server or other devices for purposes of predicting movement of that specific player. The ability to aggregate data for many different players across many different sessions enables the prediction models to account for a variety of different circumstances and occurrences, to improve the overall performance of the predictions for various types of gameplay.

In some embodiments a game server can run active gameplay and update models as new data is received. In other embodiments the gameplay database can be expected and new prediction models generated offline and at regular intervals, such as daily or weekly, although other periods or triggers can be generated, as may be based at least in part upon actual game and prediction performance. The amount of success, as well as inaccuracies, in the various predictions can also be analyzed to detect patterns where the predictions can be improved, for purposes of improving the models. In some embodiments there can be multiple models created with a variety of drift amounts from known good models. Gaming servers operating in a testing pool, for example, can retrieve data models marked as more experimental, with more drift from a previously known good model. Dedicated servers operating in a production (e.g., non-testing) pool can either retrieve a known good data model, for example, or data models with minimal drift. In some embodiments a server can create or select custom tailored predictive models that may be specific to certain situations, levels, sections, or other game aspects. The models selected may also be based at least in part upon a current state of a data connection, such as where one model might be appropriate for a fast connection while another model might be appropriate for connections with high amounts of latency. For example, the average latency or maximum latency can be monitored for connections on a gaming session, and a model selected or modified based at least in part upon the current latency conditions. If the connection quality changes, the predictive model used can change accordingly. In some embodiments the gaming server for a session can provide a client device with a new predictive model during an active match or gaming session to help correct for the change. Some gaming servers can utilize predictive models to predict the appropriate trained predictive model for a current game state, for example, and can send that model down to the devices for use and/or testing as discussed herein.

In addition to providing more accurate results, such an approach can minimize the amount of manual coding needed to add predictive capabilities to a gaming application. For example, the developer can indicate the models, or types of models, to be used for prediction. The models can then be provided as appropriate during a gaming session, and the training of the models can be performed offline and separate from the game. In some embodiments the training of the models may even be performed by a third party or other such source. As mentioned, the training can take advantage of the actual client-side prediction data as well as the actual game state data, in order to determine patterns of inaccuracies and provide more accurate adjustments. The game server can push out new models when a new session starts or a new game device joins a session, for example, and can optionally update those models as appropriate during the game session.

Figure 2A:
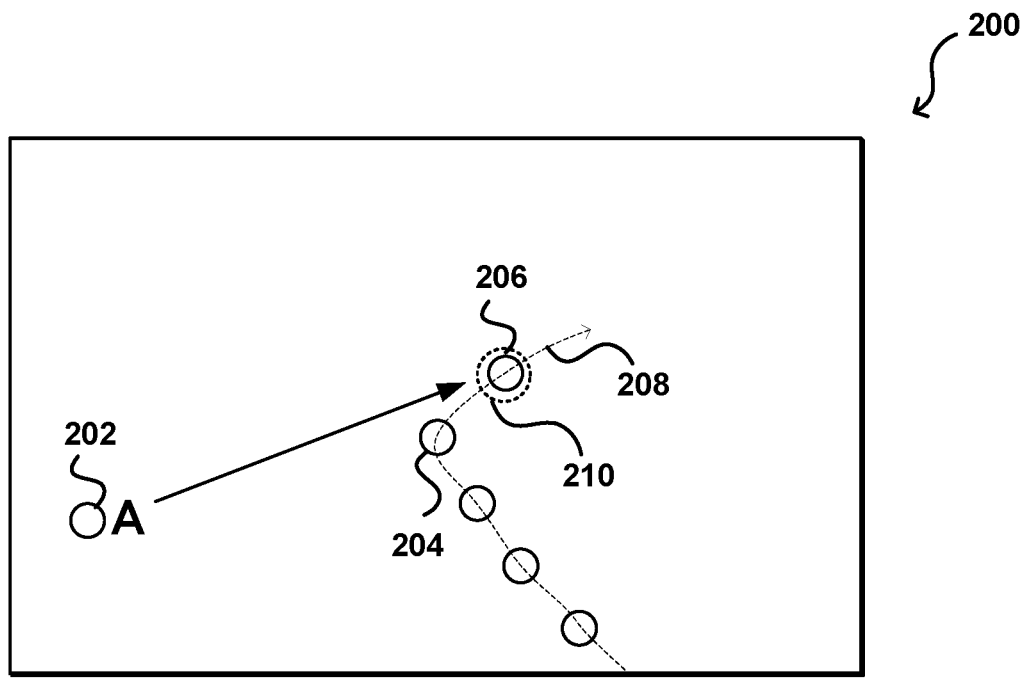
FIGS. 2A and 2B illustrate example predictions based on trained models that can be generated in accordance with various embodiments.
Figure 2B:
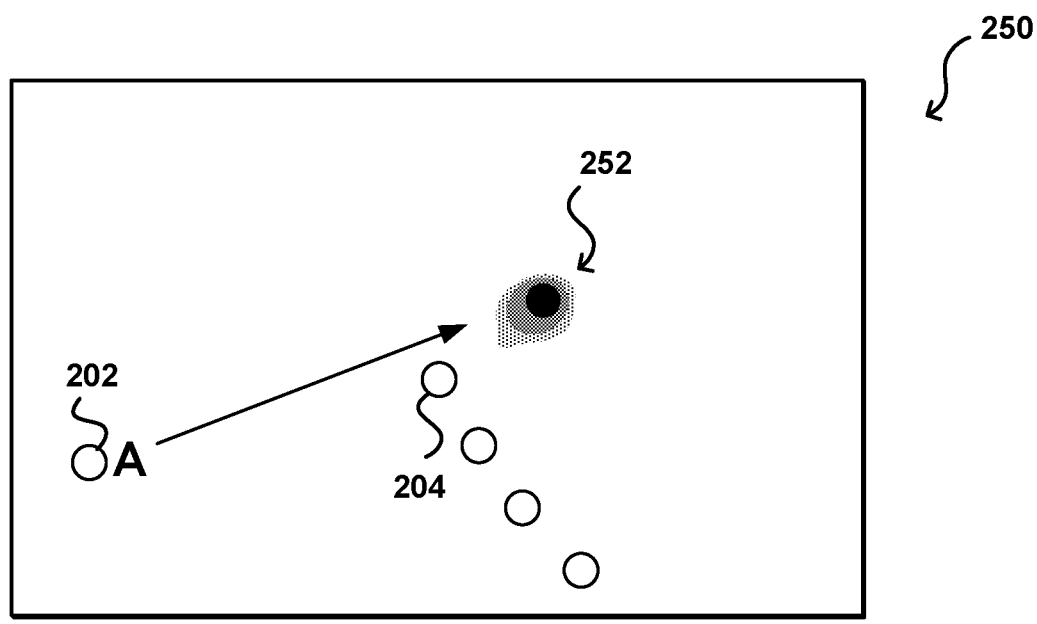

FIG. 2A illustrates the prediction result 200 of a first trained predictive model that can be generated in accordance with various embodiments. The basic pattern of location data over a recent period of time corresponds to that of FIG. 1B for comparison. In this example, Player A is at a specific location 202 where the player is attempting to throw a ball towards Player B. The last known position 204 of Player B is illustrated, but the device for Player A does not yet have information as to the next position of Player B in the game, and will not receive the position data in real time. As discussed, using the last known position or a simple extrapolation based on recent position data will result in an inaccurate determination in this example. Using a trained model, or other machine learning-based approach such as may involve a neural network or deep learning algorithm, as well as historical user behavior for this state of the game, the model can predict a path of motion of Player B in order to predict with relative accuracy the location 206 at which Player B will be located when the ball arrives along the trajectory from Player A. Other machine learning approaches can be used as well, as may involve decision trees, inductive logic, Bayesian networks, and the like. In some embodiments a specific location will be provided, while in others there might be a region 210 where the Player likelihood is above a specified likelihood threshold. In some embodiments, as is illustrated in the prediction 250 of FIG. 2B, a probability distribution 252 may be provided from the prediction model that indicates a relative confidence or likelihood that Player B will be at a specific set of locations at a specified future point in time. When the ball from Player A arrives at the specified time, a combination of the accuracy or confidence in the throw, the distance from the player position, and the confidence level at that location, for example, can be used to determine whether or not the ball was accurately thrown. Thus, a very well thrown ball that is delivered to a lower confidence region might be determined to be successful, as well as a somewhat poorly thrown ball that was delivered to a lower confidence location in the probability distribution, depending upon rules or guidelines established in the game logic. Various other ways for providing predictions and determining success of related actions can be used as well within the scope of the various embodiments.

As mentioned, different models can be provided for different types of situations. Network conditions or device capabilities may be considered when selecting an appropriate model. Various other factors may be considered as well, such as the skill levels of the players, character abilities, game level, retry number, available player data, and the like. The values of these aspects can be monitored during and between game sessions such that the most appropriate model can be used at any given time. In some embodiments the accuracy of a model can be monitored, and if the predictions do not satisfy a minimum accuracy criterion then a different model can be utilized or a new version of that model can be provided that has updated training based on recent gameplay data, among other such options. In some embodiments the models can be developed with specific purposes in mind, while in other embodiments similar models can be used but different sets or types of training data provided in order to train the model for specific purposes or situations. The trained models can learn how players behave in certain levels, in certain situations, when combing across certain gameplay elements, and the like. This information can be combined with information for a specific player or character, and their skills or abilities, in order to make a relatively accurate position of future actions. The accuracy not only helps ensure accurate gameplay determinations, but can result in smoother gameplay as the player positions do not need to be frequently corrected due to inaccuracies in player location prediction.

In some embodiments there may be a default set of models to use for a game. A quick quality of service check can be performed before a gaming session to determine the capabilities (e.g., frame rate and resolution) and connection quality (i.e., latency detected from pings) of the various devices, and this information can be used to select an appropriate model for that game under those conditions. The prediction accuracy on the gaming session can be monitored and the model adjusted or swapped as appropriate based on differences between the monitored and target accuracy levels. Additional testing or adjustments can be made as well to attempt to improve performance. For example, a gaming app might use a first model for the actual determinations, but also run at least a second model to determine whether the second model (or other parameters or assumptions for the model) might provide better performance or gameplay. For example, the overall latency for a gaming session might be determined to be 70 milliseconds, but it might be determined that using a predictive model for a 100 millisecond latency provides improved performance. This might be due to any of several different factors, such as a slow render time or low frame rate on a particular machine. In some embodiments, the data can be analyzed offline after a gaming session to determine whether a different model would have provided better results, and then that model can be used for future gaming sessions with similar conditions, although the prior model can also be further trained with the additional data to improve performance of that model as well. In some embodiments, a gaming service can store various models tagged with information about the success of the model under various circumstances, such that for a new gaming session (or session underway) the server can determine an appropriate initial model to use for the session. A selection formula can be used in some embodiments, where various performance or other such factors are considered. As an example, a selection formula can include parameters such as frame rate, latency, packet loss, processor speed, available memory, and the like. The same or a different formula can consider other factors as well, such as the experience or skill levels of the players, the level or type of game, etc. In some embodiments the service can have a set of pre-tuned predictive models for different types of games as well, such as models for racing games, adventure games, or first person shooters, among other such options.

In various embodiments the game server will be authoritative, even though the individual client devices or applications can be making predictions locally. The clients can make local predictions to provide a more accurate view of another player's location or orientation, for example, but the actual locations of those players will be determined by the game server. Without local determinations, players would need to estimate where other players will be at future points in time and act accordingly, such as to throw in front of a player so the ball is actually located where the player will be located at that time, even though the displayed location will not be there yet. In some embodiments the actual authoritative action would not be determined locally but on the game server. Thus, the actual receiving of a ball or hit of a paint gun pellet might be displayed with some delay based on the latency of getting the location information to the game server to be aggregated and analyzed to determine the appropriate action, then send that information down to the client device. Thus, the gameplay can be more accurate but reactions somewhat delayed. This can be beneficial to players as players would, in general, rather have the gameplay be similar to that of a non-networked game but have some of the reaction graphics or aspects be somewhat delayed as a result. The server can get the position data of the various players and do the appropriate interpolation or extrapolation to arrive at the appropriate determination. For example, if the game server sees that a player detonated a paint bomb at a specific time in the recent past, due to the latency in getting the information, the server can determine the locations of the players at that point in time and determine which would have been included in the blast radius. The server can then send this information to the client devices so they can, at some time in the future corresponding to the latency, display the detonation and the impact on the affected players. In some embodiments a player device might render the detonation and impact on any players that must have been in the blast radius, but subsequently render the impact on other players once that information is received from the game server.

As the trained models learn player behavior for a game over a period of time, the models can also relatively accurately predict the locations of players at specific times in the future. For example, the machine learning can learn the paths people follow; where they pause, run or jump; where they shoot or perform various actions; as well as how long it takes to perform specific actions. The machine learning can also learn separate sets of actions for different types of characters, players, etc. This can further help to improve gameplay by enabling the pre-loading of specific data or animations, adapting for anticipated resource needs, and the like. The model can also determine how behavior adjusts when a player is low in ammo, is about to achieve a new level, has a low health status, or is in another such state. Various other factors and relationships can be learned to help prediction the locations, orientations, and actions of various players at future points in time. The learning of specific types of behaviors can also help to identify cheaters, outliers, or other players that significantly differ from other players, such that those players can be addressed appropriately. The models can also identify types of level design or gameplay elements that may be problematic, or too difficult, such that adjustments can be made to the game to improve gameplay.

Figure 3:
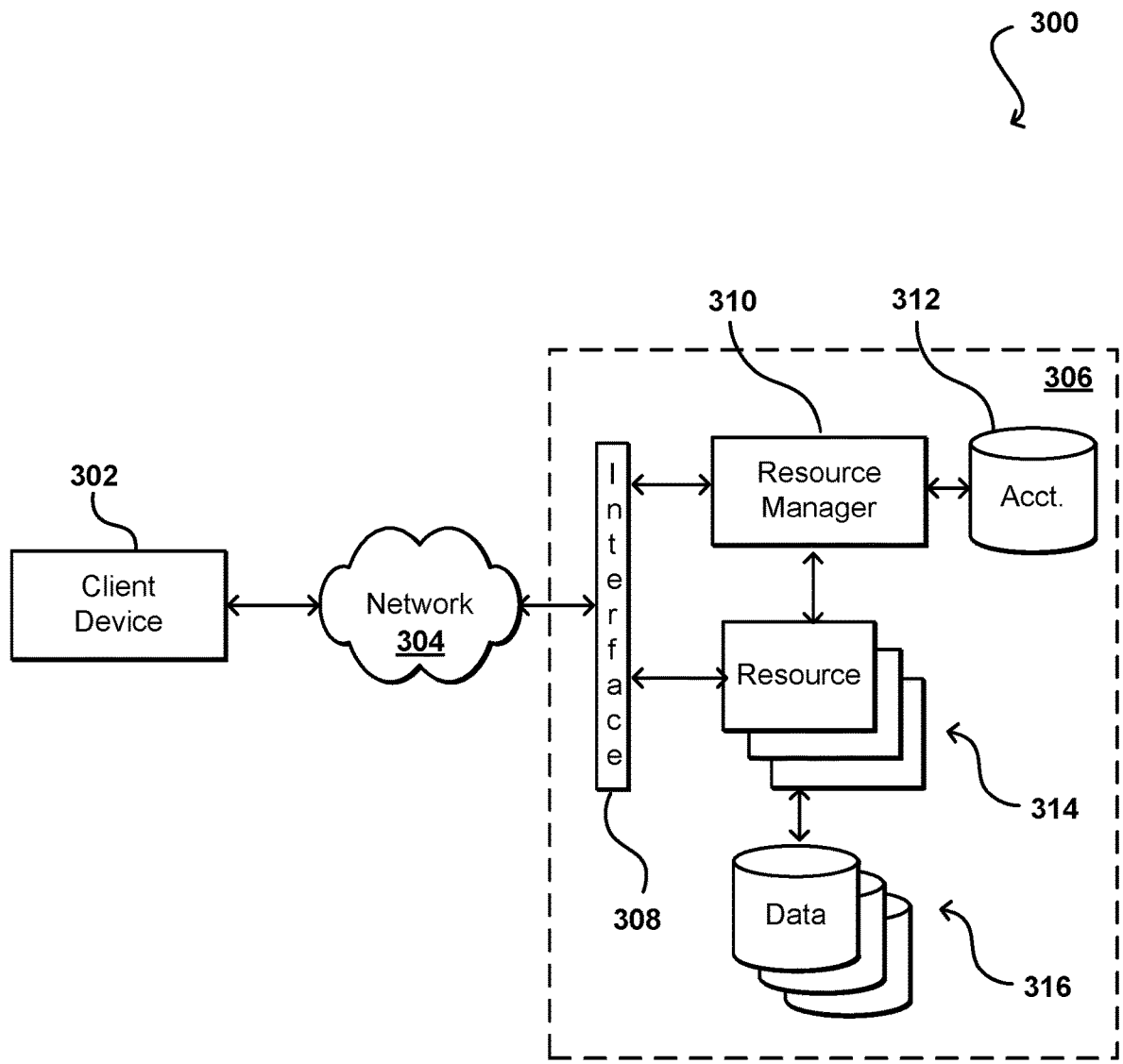
FIG. 3 illustrates an example environment in which various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
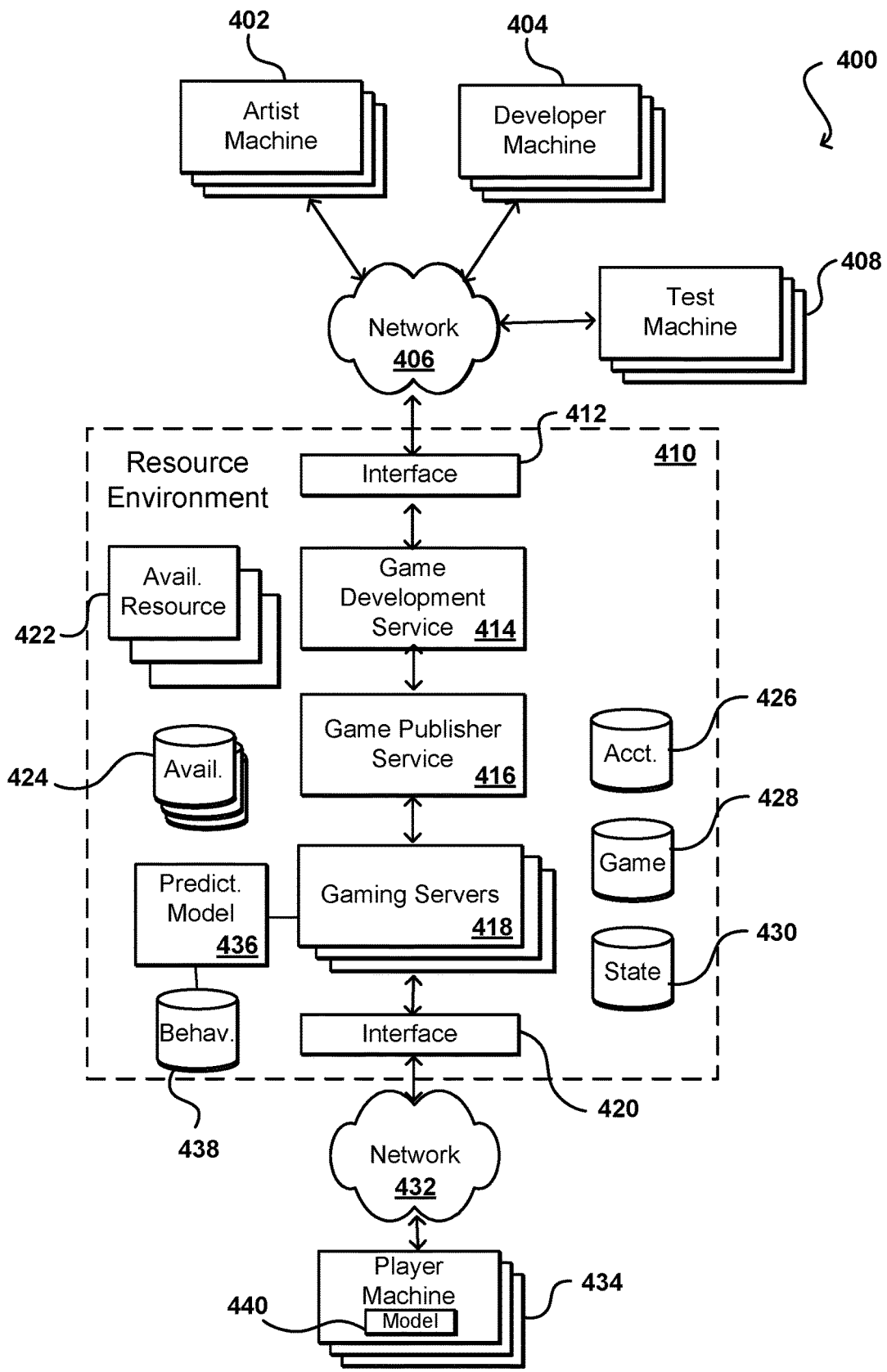
FIG. 4 illustrates an example gaming pipeline that can be used in accordance with various embodiments.

As illustrated in the example system 400 of FIG. 4, at least some of the resources can be used to support platforms and services useful in the development and providing of electronic gaming and three-dimensional graphical content, among other such options. For example, the artist machines 402 and developer machines 404 can collaborate via a game development service 414, which can be provided by a set of resources in the resource environment 410 that are able to scale dynamically as discussed above. It should be understood that artists fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 428, where the repositories can include graphics files, code, audio files, and the like. The game development service 414 can also work with an account manager, or at least maintain information in an account data store 426, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 416. The game publisher service 416 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 404 or otherwise. In some embodiments the game content might be published and made available to one or more test machines 408, which may be associated with the customer, such that the customer can test various builds or versions of the game. In some embodiments feedback provided by the test machines 408 may be provided to the game development service 414, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 418 which can run the game and enable player machines 434 to access the game content over one or more networks 432, which may be different from the network(s) 406 used for game development. This can include, for example, dedicated gaming networks, the Internet, cellular networks, and the like. The player machines 434 can communicate with the appropriate interfaces of an interface layer 420 to obtain the gaming content. In some embodiments the player machines 432 will download the gaming content for execution on the individual machines, and will upload (or otherwise communicate) gaming data, messages, and other information to the gaming servers 418, as well as to other players, social networking sites, or other such recipients. The gaming servers 418 can cause state information for the various instances of the game to be stored to at least one game state repository. This can hold state for the game as a whole or for individual game sessions, among other such options. In some embodiments the game content can be executed by the game servers and streamed in near real time to the player machines 434. In some embodiments there may alternatively be a mix of gaming content executed on the player machines and the gaming servers. Peer to peer connections among the player machines and other communications can be utilized as well in various embodiments.

Such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the game servers 418 can work with one or more predictive modeling components 436 to train, update, and manage predictive models. The components can train the models using historical behavior data 438 for the game, and provide these trained models to the player machines 434 for the corresponding gaming sessions. The player devices themselves 434 can execute the predictive models 440 locally in order to predict the locations and orientations of various player elements of the game, in order to render the elements in a way to minimize the impact of latency between the various player devices 434 and the dedicated gaming server 418. As mentioned, the gaming server can be authoritative in many embodiments, such that the predictions made on the client device can help with rendering and gameplay, but the actual gameplay decisions are made by the gaming server 418 and propagated to the player machines 434 for the session. The prediction data and actual gameplay data can be fed back to the predictive modeling component 436 in order to update the models and improve prediction accuracy.

Figure 5:
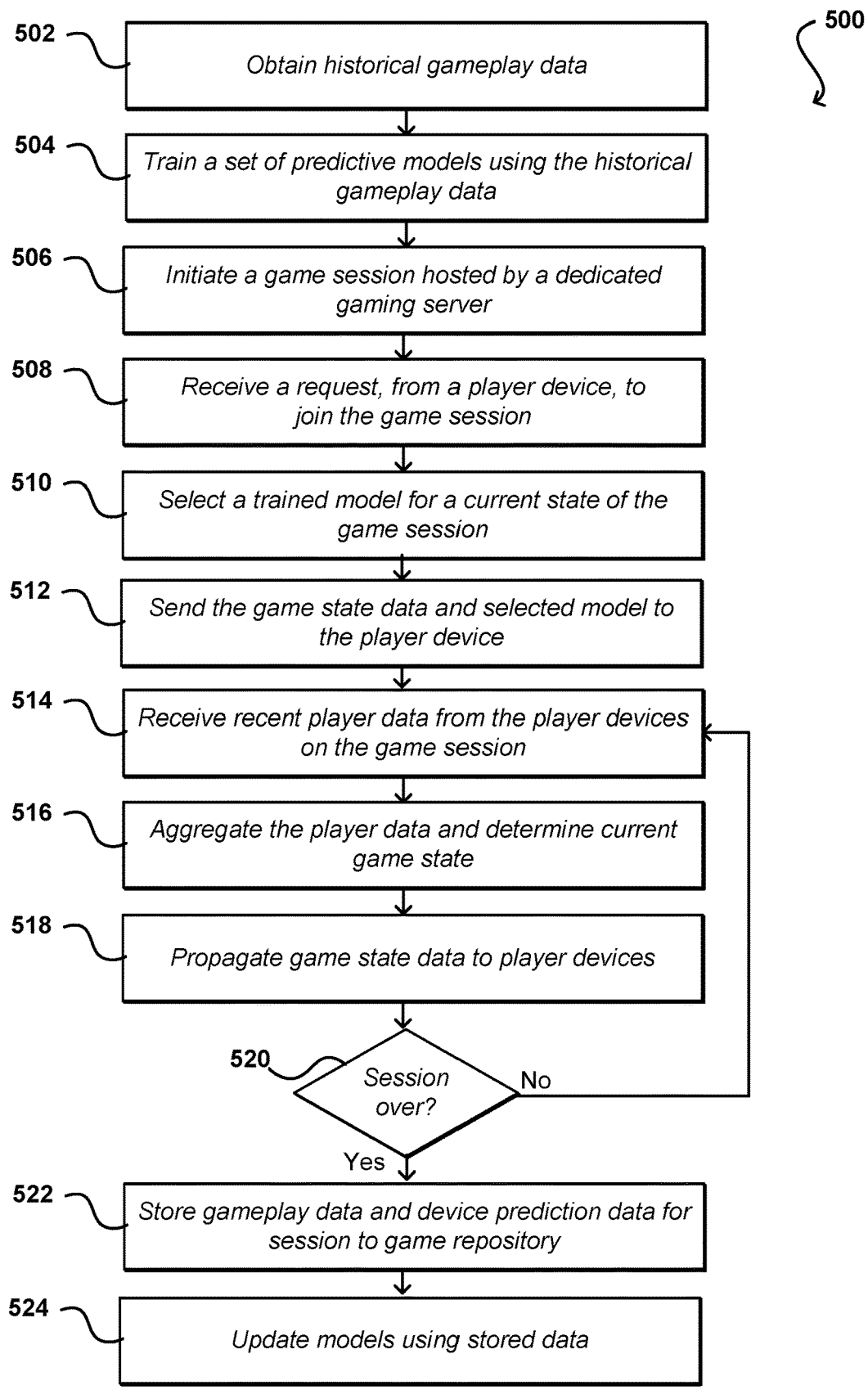
FIG. 5 illustrates an example process for using trained models for gameplay predictions that can be utilized in accordance with various embodiments.

FIG. 5 illustrates an example process 500 for utilizing predictive positioning in a multiplayer game that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well, where the users are selected from a pool of potential users for a specific session or purpose, etc. In this example, a set of historical data is obtained 502. The data can be for the same game to be hosted or a different type of game of the same type, among other such options. The data can include relevant data for predictive modeling, including player movement and position data, as well as device and network capability data, among other such options. The data can be generated by a gaming service, obtained from player devices, or obtained from a third party service, etc. Using the historical gameplay data, a set of predictive models can be trained 504 that can be used to predict player input over a future period of time, as may correspond to the movement, actions, and changes in orientation of a character or gameplay element controlled by a player of the relevant game. The models can be, for example, based on neural networks or other machine learning algorithms as discussed and suggested elsewhere herein. Subsequent to the initial training in this example, a game session can be initiated 506 that is to be hosted by a dedicated gaming server. It should be understood that a "dedicated" server can be the server allocated to hosting a session, but that the server can also host other sessions or perform other functions and is not solely dedicated to a particular gaming session in at least some embodiments. There may also be multiple servers or redundant servers, among other hosting options.

During or at the start of a game session, a request can be received 508 from a player device to join the game session. This can include receiving the request from a gaming application executing on the device, a webpage from which the game can be launched, or another such source. In response, game code and game state data for the session can be determined as appropriate in order to enable the player device to join in the session. Further, a trained predictive model can be selected 510, where the selection can be based at least in part upon the specific game, the type of game, current session state, or other such information as discussed and suggested herein. The game state data, the selected model, and any game code or other necessary gaming content can be sent 512 to the player device in order for the device to join in the session and enable the user to play the network-based multiplayer game. The gaming device can execute the gaming content and enable the user of the device to join in the game session. The predictive model can be used to predict player positions and other actions, which can help to provide a smoother and more accurate gameplay experience. During the gaming session, player data can be received 514 from the various player devices. This can include, for example, any input or actions taken by the user, as well as any relevant gameplay data generated by the computing device. As discussed herein, this can also include prediction data in at least some embodiments, which can be used to train and select new models for the game. The data received from the various devices can be aggregated 516 and used with gameplay data at the server to determine the game state. This can include, for example, determining the position, orientation, and actions performed by each player at specific recent points of time, and determining the corresponding state of the game at those points in time based upon the received and aggregated data. This authoritative game state data can then be propagated 518 to the various player devices such that the player devices can operate under a consistent game state and can update their predicted game state data accordingly. Until it is determined 520 that the game session is over, or another termination criterion is met, the process can continue. Once the session is over, or there are no active players on the session, for example, the gameplay data for the session can be stored 522 to a game repository or other such storage location. Additional data can be stored as well, such as information about the predictive models used and the prediction data that was generated by the models. The models can then be updated 524 using the stored data. This can include, for example, further training the models with the additional data or training new models from scratch with the new data set, among other such options. As mentioned, information can also be determined such as the accuracy of each model for various gaming circumstances, which can be useful in selecting models for future gaming sessions.

Figure 6:
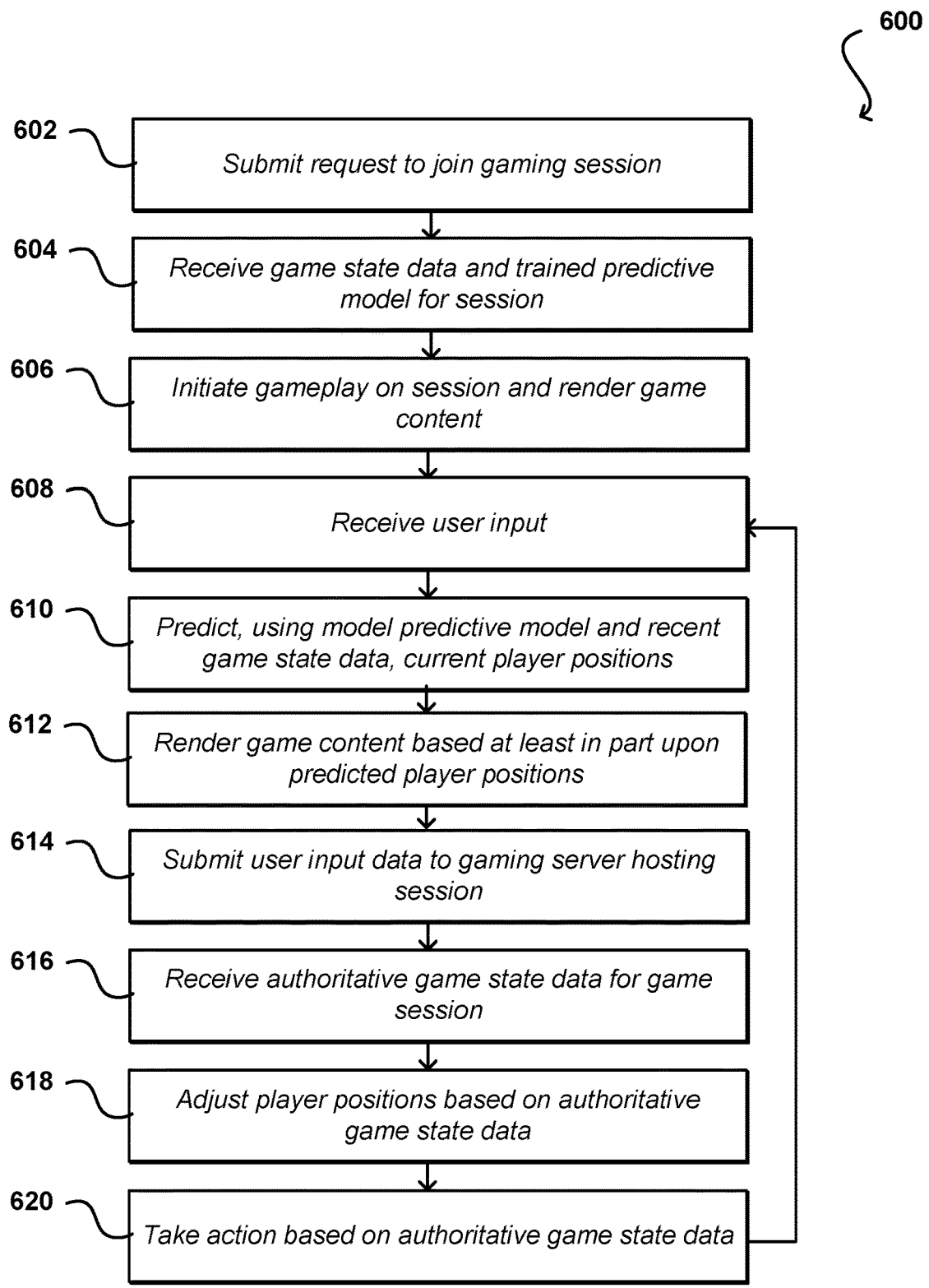
FIG. 6 illustrates an example process for client side prediction of gameplay state using one or more trained models that can be utilized in accordance with various embodiments.

FIG. 6 illustrates an example process 600 for predicting game state on a player device. that can be utilized in accordance with various embodiments. In this example, a request to join a gaming session is submitted 602 from the player device to, for example, a dedicated gaming server of a gaming service or multiplayer game provider. If approved, game state data can be received 604 that enables the game software on the client device to join in the session according to the most recent authoritative state of the session. The player device can also receive at least one trained predictive model for use in the game session, or indication of a model already stored on the device. Gameplay for the session can then be initiated 606 on the player device by, for example, executing the game code and processing the authoritative state data to render a perspective-appropriate view of the game content. As mentioned, the perspective may be based on one or more virtual camera angles associated with a respective player on the game session. During execution of the game session, the game can receive 608 various types of user input. As known for various types of gaming, these can include input via a controller, touch screen, motion capture, audio capture, gesture detection, and the like. The input can control various actions or aspects of the game, such as actions taken by a player character in the game. As mentioned, there will be some amount of latency involved in receiving data for the input provided by other players at the same time in the game. Accordingly, the local application can predict 610, using a specified predictive model and recent game state data, the positions, orientations, and other aspects of characters or other gameplay elements controlled by other players on the session. As mentioned, the recent game state data can include recent position, orientation, and/or action data for those gameplay elements, as well as other information about the types or capabilities of those elements. The next frame, or set of frames, of game content can then be rendered 612 based at least in part upon the predicted character locations, orientations, and actions. The user input data can also be submitted 614 to the dedicated gaming server hosing the session, which can aggregate the data from all player devices on the session and provide a set of authoritative game data based on the set of player inputs. The authoritative game state data can be received 616 from the dedicated server, and the local gaming application can adjust 618 positions and other aspects of the various gameplay elements based on the authoritative game state data. This can involve making corrections from the predicted state used to render previous frames. The appropriate action(s) can then be taken based on the authoritative game state data, such as to render an animation, register a hit, log a point or goal, etc. In some embodiments a new predictive model might also be received that should be used for future predictions in order to attempt to improve the accuracy of the predictions. As mentioned, the prediction data from the player device can be provided to the game server, or another such destination, for use in further training the various predictive models. The process can continue at least for the duration of the session or until the player device is no longer actively involved in the gaming session, among other such termination criteria.

Figure 7:
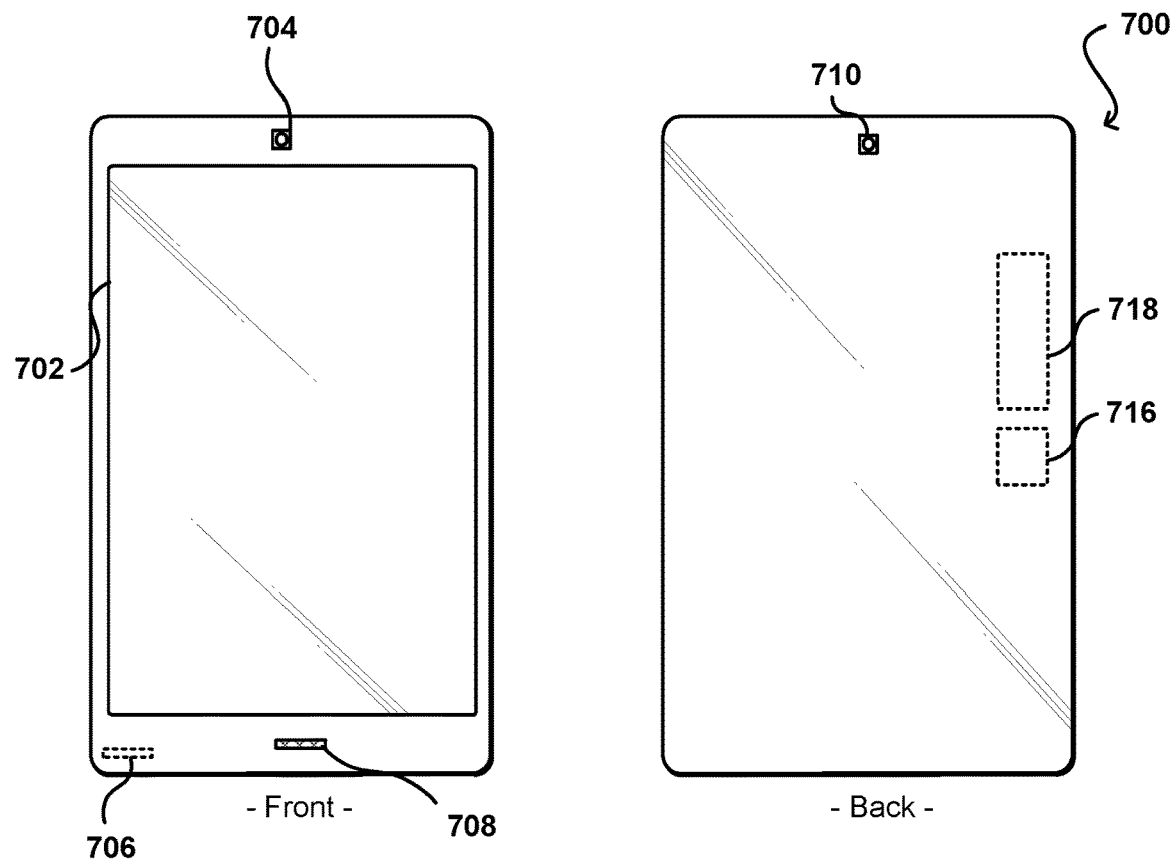
FIG. 7 illustrates an example computing device that can execute a gaming application in accordance with various embodiments.

FIG. 7 illustrates front and back views of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display screen of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 708 on the front side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one communication mechanism 706, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

Figure 8:
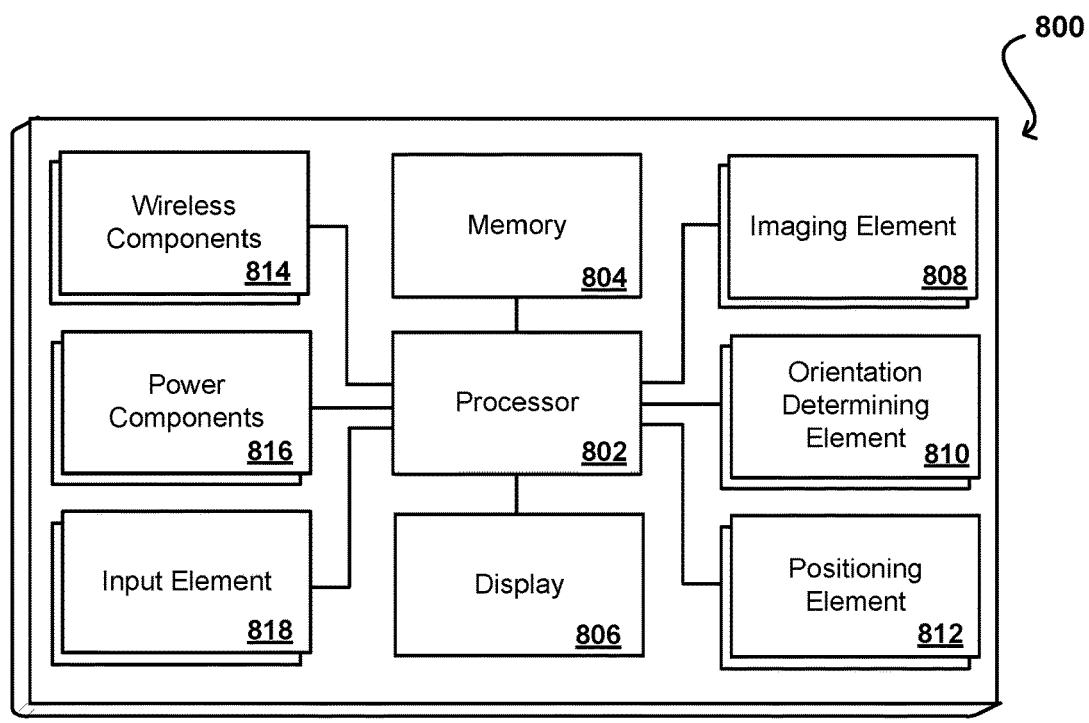
FIG. 8 illustrates example components of a computing device that can be used to implement aspects of the various embodiments.

FIG. 8 illustrates a set of basic components of an electronic computing device 800 such as the device 800 described with respect to FIG. 7. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of communication approaches can be available for sharing with other devices.

The device typically will include some type of display screen 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving, from a first client device, a request to join a first multiplayer session hosted by a gaming server, the first multiplayer session comprising a player character configured to change position responsive to player input provided by a second client device;
sending, to the first client device, session data and a predictive model for the first multiplayer session, the predictive model trained using historical behavior data associated with the player character from a second multiplayer session that was previously completed, the predictive model further enabling the first client device to predict future positions of the player character during the first multiplayer session for purposes of rendering gameplay content, and the trained predictive model being selected, based at least in part, on a game type;
receiving, from the first client device and the second client device, player input data for the first multiplayer session;
generating authoritative game state data based at least in part upon the session data and the player input data; and
sending the authoritative game state data to the first client device, at a predetermined interval selected to reduce resource consumption, wherein the first client device is able to adjust the rendered gameplay content to account for differences between predicted position data from the predictive model and the subsequently received authoritative game state data.

2. The computer-implemented method of claim 1, further comprising:
receiving, from the first client device and the second client device, the predicted position data for the gaming session; and
further training the predictive model using the predicted position data and the authoritative game state data.

3. The computer-implemented method of claim 1, further comprising:
training, using machine learning and different training parameters, a set of predictive models;
determining at least one session parameter for the first multiplayer session; and
selecting, based at least in part upon the at least one session parameter and from the set of predictive models, the predictive model for the first multiplayer session.

4. The computer-implemented method of claim 3, further comprising:
monitoring an accuracy of the selected predictive model during the first multiplayer session; and
selecting a new predictive model for the first multiplayer session in response to the accuracy falling below a minimum accuracy threshold.

5. A computer-implemented method, comprising:
receiving position data for a gameplay element in an online multiplayer game, wherein a position of the gameplay element in the multiplayer game is modified responsive to user input provided via a client device;
analyzing the position data using a trained predictive model to predict a future position for the gameplay element in the game at a determined time, wherein the trained predictive model has been trained using historical behavior data associated with the gameplay element from at least one completed session of the multiplayer game, and the trained predictive model being selected, based at least in part, on a game type;
utilizing the predicted future position for the gameplay element in rendering game state for the determined time; and
updating the rendered game state at a later time upon receipt of authoritative game state data, generated at a gaming server and transmitted at a predetermined interval selected to reduce resource consumption.

6. The computer-implemented method of claim 5, further comprising:
receiving actual position data for the gameplay element at the determined time; and
adjusting the game state based on the actual position data.

7. The computer-implemented method of claim 6, further comprising:
rendering gameplay content based at least in the predicted future position; and
adjusting the rendered gameplay content to be rendered in response to determining differences between the predicted future position and the actual position data.

8. The computer-implemented method of claim 6, wherein the actual position data is part of a set of authoritative game state data generated by a gaming server, the authoritative game state data generated based on game data received from multiple player devices for the multiplayer game, and further comprising:
determining one or more actions to take with respect to a gameplay element based at least in part upon the authoritative data.

9. The computer-implemented method of claim 6, further comprising:

further training the predictive model using the predicted future position and the actual position data.

10. The computer-implemented method of claim 9, further comprising:
performing an initial training of the predictive model using a set of historical gameplay data.

11. The computer-implemented method of claim 5, further comprising:
detecting a change in network transmission conditions; and
selecting a new trained predictive model based at least in part upon the change in network transmission conditions.

12. The computer-implemented method of claim 5, further comprising:
utilizing actual position data for the gameplay element to determine whether a type of interaction occurs between the gameplay element and a second gameplay element.

13. The computer-implemented method of claim 5, further comprising:
detecting a pattern of inaccuracy involving the predicted future position; and
selecting a different trained predictive model to use for the online multiplayer game based at least in part upon the pattern of inaccuracy.

14. The computer-implemented method of claim 5, further comprising:
training, using machine learning and different training parameters, a set of predictive models;
determining at least one session parameter for the online multiplayer game; and
selecting, based at least in part upon the at least one session parameter and from the set of predictive models, the trained predictive model for the online multiplayer game.

15. A system, comprising:
at least one processor; and
memory including instructions that, when executed by the at least one processor, cause the system to:
receive position data for a gameplay element in an online multiplayer game, wherein a position of the gameplay element in the multiplayer game is modified responsive to user input provided via a client device;
analyze the position data using a trained predictive model to predict a future position for the gameplay element in the game at a determined time, wherein the trained predictive model has been trained using historical behavior data associated with the gameplay element from at least one completed session of the multiplayer game, and the trained predictive model being selected, based at least in part, on a game type;
utilize the predicted future position for the gameplay element in rendering game state at the determined time; and
update the rendered game state at a later time upon receipt of authoritative game state data, generated at a gaming server and transmitted at a predetermined interval selected to reduce resource consumption.

16. The system of claim 15, wherein the instructions when executed further cause the system to:
receive actual position data for the gameplay element at the determined time; and
adjust the game state based on the actual position data.

17. The system of claim 16, wherein the instructions when executed further cause the system to:
render gameplay content based at least in the predicted future position; and
adjust the gameplay content to be rendered in response to determining differences between the predicted future position and the actual position data.

18. The system of claim 15, wherein the actual position data is part of a set of authoritative game state data generated by a gaming server, the authoritative game state data generated based on game data received from multiple player devices for the multiplayer game, and wherein the instructions when executed further cause the system to:

determine one or more actions to take with respect to a gameplay element for the gameplay element based at least in part upon the authoritative data.

19. The system of claim 15, wherein the instructions when executed further cause the system to:

train, using machine learning and different training parameters, a set of predictive models;

determine at least one session parameter for the online multiplayer game; and select, based at least in part upon the at least one session parameter and from the set of predictive models, the trained predictive model for the online multiplayer game.

20. The system of claim 15, wherein the instructions when executed further cause the system to:

detect a pattern of inaccuracy involving the predicted future position; and select a different trained predictive model to use for the online multiplayer game based at least in part upon the pattern of inaccuracy.

* * * * *